US012089296B2

(12) United States Patent
Yun et al.

(10) Patent No.: US 12,089,296 B2
(45) Date of Patent: Sep. 10, 2024

(54) CERAMIC HEATER

(71) Applicant: MICO CERAMICS LTD., Anseong (KR)

(72) Inventors: Soo Won Yun, Pyeongtaek (KR); Chul Ho Hwang, Suwon (KR)

(73) Assignee: MICO CERAMICS LTD., Anseong (KR)

( * ) Notice: Subject to any disclaimer, the term of this patent is extended or adjusted under 35 U.S.C. 154(b) by 525 days.

(21) Appl. No.: 17/281,531

(22) PCT Filed: Dec. 2, 2019

(86) PCT No.: PCT/KR2019/016867

§ 371 (c)(1),
(2) Date: Mar. 30, 2021

(87) PCT Pub. No.: WO2020/153596

PCT Pub. Date: Jul. 30, 2020

(65) Prior Publication Data

US 2022/0046761 A1 Feb. 10, 2022

(30) Foreign Application Priority Data

Jan. 23, 2019 (KR) ........................ 10-2019-0008526

(51) Int. Cl.

*H05B 3/06* (2006.01)
*H05B 3/12* (2006.01)
*H05B 3/22* (2006.01)

(52) U.S. Cl.

CPC ................. *H05B 3/06* (2013.01); *H05B 3/12* (2013.01); *H05B 3/22* (2013.01); *H05B 2203/016* (2013.01)

(58) Field of Classification Search

CPC .......... H05B 2203/016; H05B 2203/17; H05B 3/06; H05B 3/12; H05B 3/22; H05B 3/283; H05B 3/74

See application file for complete search history.

(56) References Cited

U.S. PATENT DOCUMENTS

| | | | | |
|---|---|---|---|---|
| 6,072,162 | A | 6/2000 | Ito et al. | |
| 6,204,489 | B1 * | 3/2001 | Katsuda | H05B 3/283 219/544 |
| 10,373,853 | B2 | 8/2019 | Anada et al. | |
| 2003/0173349 | A1 | 9/2003 | Unno et al. | |
| 2004/0035846 | A1 | 2/2004 | Hiramatsu et al. | |
| 2004/0265021 | A1 | 12/2004 | Kinouchi et al. | |
| 2018/0254204 | A1 | 9/2018 | Jung et al. | |

FOREIGN PATENT DOCUMENTS

| | | | |
|---|---|---|---|
| CN | 1577162 | A | 2/2005 |
| CN | 103255390 | A | 8/2013 |
| CN | 204180292 | U | 2/2015 |

(Continued)

*Primary Examiner* — Dana Ross
*Assistant Examiner* — Joe E Mills, Jr.

(57) ABSTRACT

A ceramic heater includes a heating element, and the ceramic heater is characterized in that connecting portions connecting concentric circumferences of the heating element included in the ceramic heater are formed such that symmetrical axes of pairs of the connecting portions do not pass through a center of the heating element.

8 Claims, 7 Drawing Sheets

(56) References Cited

FOREIGN PATENT DOCUMENTS

| | | | |
|---|---|---|---|
| JP | 20020093552 | A | 3/2002 |
| JP | 20050209981 | A | 8/2005 |
| JP | 2017152537 | A | 8/2017 |
| JP | 20180006269 | A | 1/2018 |
| JP | 2018537802 | A | 12/2018 |
| TW | 201633448 | A | 9/2016 |
| WO | 2019/012959 | A1 | 1/2019 |

* cited by examiner

FIG. 11A
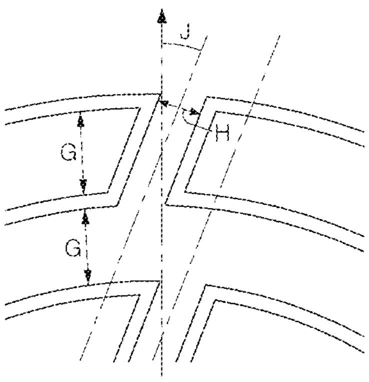
FIG. 11B
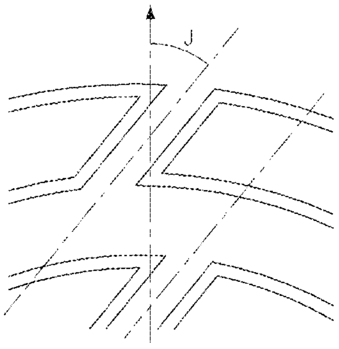
FIG. 11C
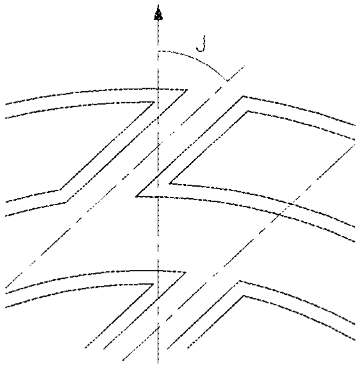
FIG. 11D
| | G DISTANCE(mm) | H DISTANCE(mm) | J ANGLE (°.degree) | TEMPERATURE AT CENTER PORTION OF LOW-TEMPERATURE REGION WHEN TEMPERATURE OF HEATER HEATING SURFACE IS 500°C |
|---|---|---|---|---|
| PRIOR ART | 1 | 0.5 | 0 | 432°C |
| EMBODIMENT a | 1 | 0.5 | 30 | 493°C |
| EMBODIMENT b | 1 | 0.5 | 45 | 498°C |
| EMBODIMENT c | 1 | 0.5 | 60 | 495°C |

CERAMIC HEATER

CROSS-REFERENCE TO RELATED APPLICATION

This application is a national stage application, filed under 35 U.S.C. § 371, of International Patent Application No. PCT/KR2019/016867, filed on Jul. 30, 2020, which claims the priority of Korean application No. 10-2019-0008526 filed Jan. 23, 2019, the contents of which are incorporated by reference.

TECHNICAL FIELD

The present disclosure relates to a ceramic heater and, more specifically, to a ceramic heater wherein concentric circumference connection portions of a heating element of the ceramic heater are formed such that extending lines of symmetrical axes of pairs of concentric circumference connection portions of the heating element of the ceramic heater do not extend through the center of a ceramic plate in order to implement uniform temperature distribution on a heating surface of the ceramic heater.

BACKGROUND ART

A ceramic heater is used to thermally treat an object to be heat-treated, such as a semiconductor wafer, a glass substrate, a flexible substrate, etc., for various purposes at a predetermined heating temperature. Typically, the ceramic heater includes a ceramic plate configured to generate heat by power supplied from an external electrode, and the ceramic plate includes a heating element which is buried therein and has a predetermined resistor. Temperature distribution on a ceramic heater heating surface can be adjusted through the arrangement and design of the buried heating element. The temperature distribution on the ceramic heater heating surface can be adjusted depending on changes in the gap between heating elements, the shape of a heating element, the material of a heating element, and the thickness of a heating element.

FIG. 1 illustrates an example of the structure of a ceramic heater 100.

Referring to FIG. 1, the ceramic heater 100 may include: a ceramic plate 110 including a heating element; and a shaft 120 including a power supply line for supplying power to the heating element. The ceramic plate 110 may include a heating surface on which an object to be heated is placed, and may be designed to transfer, using heat supplied from the heating element, heat having a predetermined temperature to the object to be heated. The shaft 120 may include a power line for supplying power to the heating element included in the ceramic plate 110.

FIGS. 2A and 2B illustrate an example of the structure of a heating element included in a conventional ceramic heater.

Referring to FIGS. 2A and 2B, in relation to a design of a ceramic heater, the ceramic heater may be designed using a single heating element, or the ceramic heater may be designed to include two or more independent heating elements buried in the ceramic heater. FIG. 2A illustrates the structure of a heating element 210 of a conventional 1-zone ceramic heater designed using a single heating element, and FIG. 2B illustrates the structure of a heating element 220 of a conventional 2-zone ceramic heater designed using two heating elements, as an example of a ceramic heater designed to have two or more independent heating elements buried therein.

In order to receive power from the outside, the heating element included in the ceramic heater illustrated in each of FIGS. 2A and 2B may be designed to have a structure in which an electrode is placed at a position, corresponding to the shaft 120, in the ceramic plate 110. In this design process, the heating element may include bent portions which are bent at an angle of about 90 degrees. In order to improve the temperature uniformity of a heating surface of the ceramic plate, the bent portions of the heating element may be formed parallel to each other while having a predetermined pattern on a two-dimensional plane including the heating element. In a semiconductor process, the ceramic heater is a component for transferring heat to an object to be heated (e.g., a wafer), and when the temperature uniformity of the heating surface of the ceramic plate 110, from which heat is transferred to the object to be heated, is good, uniform thin films can be expected to be deposited on the object to be heated. The heating element included in the ceramic plate plays the most important role for the temperature uniformity of the heating surface of the ceramic plate 110. As described above, a bent portion may be needed for heating element manufacturing. In the process of designing the structure of a heating element, the shape of the heating element around the bent portion is different from the shape of the heating element at other portions, and thus the temperature of a heating surface portion of the ceramic plate, corresponding to the bent portion of the heating element, is different from the temperature of other portions. Therefore, the temperature uniformity of the heating surface of the ceramic plate may be lost. In an example in which the uniformity of the heating surface of the ceramic plate may be lost, referring to FIG. 2A, small circular portions on a plane including the conventional 1-zone heating element 210 are low-temperature regions 211, 212, 213, 214, and 215, and a temperature in a heating surface region of the ceramic plate, corresponding to each of the low-temperature regions, may be lower than the temperature therearound. Further, referring to FIG. 2B, small circular portions on a plane including the conventional 2-zone heating element 220 are low-temperature regions 221, 222, 223, and 224, and a temperature in a heating surface region of the ceramic plate, corresponding to each of the low-temperature regions, may be lower than the temperature therearound.

FIG. 3 illustrates an enlarged partial region 230 including a low-temperature region of the conventional 1-zone heating element 210 illustrated in FIG. 2A.

Referring to FIG. 3, the heating element may include: two or more concentric circumferences; a first connection portion to a fourth connection portion 310, 320, 330, and 340 connecting the concentric circumferences; and a first bent portion to a sixth bent portion 301, 302, 303, 304, 305, and 306 connecting the concentric circumferences and the connection portions. The first connection portion to the fourth connection portion 310, 320, 330, and 340, each of which connects two neighboring concentric circumferences, may be formed as a pair, and each pair of connection portions 310 and 320 or 330 and 340 may be formed parallel to each other. Lines 361 and 362, obtained by extending a pair of connection portions 310 and 320 or 330 and 340, which are formed parallel to each other, in the lengthwise direction, may be formed between the pair of connection portions 310 and 320 or 330 and 340, and may be arranged to be line-symmetric with respect to “the connection portion pair symmetrical axis 360” parallel to the pairs of connection portions. As described above, the connection portions 310 and 320 of the conventional 1-zone heating element (210) may be formed such that the connection portion pair symmetrical axis 360 extends through the center of the heating element. When the connection portion pair symmetrical axis 360 of the pairs of connection portions connecting all concentric circumferences included in the conventional 1-zone heating element is designed to extend through the center of the heating element, as described above, low-temperature regions 211, 212, 213, 214, 215, 221, 222, 223, and 224 may be formed as illustrated in FIGS. 2A and 25.

When formation of the low-temperature region in the heating element 210 is more specifically described with reference to FIG. 3, the gap (C) between the concentric circumferences of the heating element 210 may be normally formed to be constant. The low-temperature region of the heating element 210 may be formed between the bent portions 303, 304, 305, and 306 of neighboring concentric circumferences which are not connected through the pairs of connection portions, wherein a line segment (A), connecting the fourth bent portion 304 to the fifth bent portion 305, and a line segment (B), connecting the third bent portion 303 to the sixth bent portion 306, may form an intersection point 350 at which the line segments intersect each other, and the intersection point 350 of the line segments (A) and (B) may be a point farthest away from the heating element of the ceramic plate 110, among all points on a plane in which the heating element is included. The maximum spacing distance may be A/2 or B/2. Therefore, a low-temperature region may be formed at the intersection point 350 of the line segments (A) and (B), a heating surface region of the heating element, corresponding to the low-temperature region, may have a temperature lower than the temperature therearound, and thus the temperature uniformity of the heating surface of the ceramic plate may be lost.

Further, if the distance (D) between the connection portions of the heating element 210 is decreased to reduce the low-temperature region, the heating surface of the ceramic plate 110, corresponding to the region between the connection portions of the heating element 210, may have a temperature higher than the temperature therearound, and thus the temperature uniformity of the heating surface of the ceramic plate may be lost. Therefore, it may be undesirable to reduce the low-temperature region by adjusting the distance (D) between the connection portions.

DETAILED DESCRIPTION OF THE INVENTION

Technical Problem

An aspect of the present disclosure is to provide a ceramic heater wherein the temperature uniformity of a heating surface of a ceramic plate is improved by reducing a low-temperature region of a heating element included in the ceramic heater.

Another aspect of the present disclosure is to provide a ceramic heater wherein the temperature uniformity of a heating surface of the ceramic heater is improved through a design change to the structure of concentric circumference connection portions of a heating element included in the ceramic heater.

Technical Solution

In order to achieve the above or other aspects, an aspect of the present disclosure provides a ceramic heater 100 including a heating element 400, wherein concentric circumference connection portions of the heating element are formed such that connection portion pair symmetrical axes of pairs of connection portions connecting concentric circumferences of the heating element do not extend through the center 420 of the heating element.

Further, connection portion pair symmetrical axes of the pairs of connection portions of the heating element, disposed in a first direction which is one direction from the center 420 of the heating element, may be parallel to each other. Connection portion pair symmetrical axes of pairs of connection portions of the heating element, disposed in a second direction which is another direction different from the first direction from the center 420 of the heating element, may be parallel to each other.

Further, the connection portion pair symmetrical axes of the pairs of connection portions of the heating element, disposed in the first direction, may be parallel to the connection portion pair symmetrical axes of the pairs of connection portions of the heating element, disposed in the second direction, wherein the first direction and the second direction are formed to be opposite to each other with reference to the center 420 of the heating element.

Further, each connection angle of the heating element included in the ceramic heater 100 may be larger than a threshold angle but smaller than a right angle, wherein the connection angle is an acute angle among angles formed by an extension line and the connection portion pair symmetrical axes of the heating element, and the threshold angle is an acute angle among angles formed by the extension line and the connection portion pair symmetrical axes when a bent portion connected to the pairs of connection portions of the heating element is positioned on the extension line.

Further, the connection angle may be 30 to 60 degrees.

Further, the material of the heating element 400 may contain one of Mo2C, MoC, Mo3C2, and Mo.

Further, the material of the heating element 400 may be mixed or coated with one of Ti or C.

Advantageous Effects

According to the ceramic heater 100 according to the present disclosure, it is possible to provide the ceramic heater wherein the temperature uniformity of a heating surface of a ceramic plate is improved by reducing a low-temperature region of a heating element included in the ceramic heater.

According to the ceramic heater 100 according to the present disclosure, it is possible to provide the ceramic heater 100 wherein the temperature uniformity of a heating surface of the ceramic heater is improved through only a design change to the structure of connection portions connecting concentric circumferences of a heating element included in the ceramic heater without adding any additional device.

BRIEF DESCRIPTION OF THE DRAWINGS

FIGS. 11A to 11D illustrate temperature distribution on a heating surface of the ceramic heater 100 based on a connection angle (J) of the 1-zone heating element 400 included in the ceramic heater 100 according to an embodiment of the present disclosure.

BEST MODE FOR CARRYING OUT THE INVENTION

Hereinafter, the present disclosure will be described in detail with reference to the accompanying drawings. In the accompanying drawings, the same or like elements will be designated by the same or like reference signs as much as possible. Further, a detailed description of known functions and/or configurations will be omitted. The following description of the present disclosure is mainly directed to the parts required to understand operations according to various embodiments, and a description of elements that may make the subject matter of the present disclosure unclear will be omitted. In the accompanying drawings, some elements may be exaggerated, omitted, or schematically illustrated. Further, the size of each element does not completely reflect the actual size, and thus the present disclosure is not limited by the relative sizes and distances of elements illustrated in the respective drawings.

Further, such terms as “a first” and “a second” may be used to describe various elements, but the corresponding elements are not limited by these terms. These expressions are used only for the purpose of distinguishing between one element and any other element.

It should be understood that when an element is referred to as being “connected” or “coupled” to another element, it may be connected or coupled directly to the other element, or any other element may be interposer between them. In contrast, it should be understood that when an element is referred to as being “directly connected” or “directly coupled” to another element, there are no element interposed between them.

A singular expression includes a plural expression unless they are definitely different in a context.

As used herein, the expression “include” or “have” are intended to specify the existence of mentioned features, numbers, steps, operations, elements, components, or combinations thereof, and should be construed as not precluding the possible existence or addition of one or more other features, numbers, steps, operations, elements, components, or combinations thereof.

Figure 4:
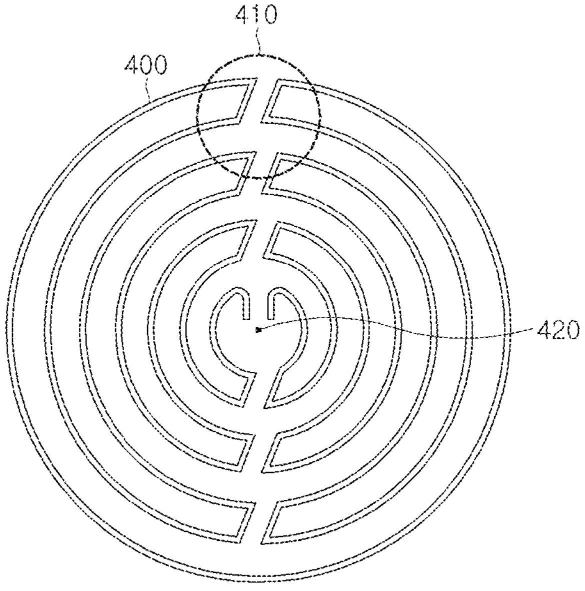
FIG. 4 illustrates the structure of a 1-zone heating element 400 included in the ceramic heater 100 according to an embodiment of the present disclosure.

FIG. 4 illustrates the structure of a 1-zone heating element 400 included in the ceramic heater 100 according to an embodiment of the present disclosure.

Referring to FIG. 4, both ends of the heating element 400, at which electrodes of the heating element 400 are formed respectively, may be designed to be positioned close to the center portion of the heating element 400 such that the electrodes of the heating element 400 can be positioned within a region corresponding to the shaft 120 in order to supply power to the heating element. The heating element 400 may include multiple pairs of connection portions which connect multiple concentric circumferences, wherein the pairs of connection portions may be formed in an oblique direction rather than being positioned on a straight line, like the form in which the pairs of connection portions are included in a conventional heating element. The connection directions of the multiple pairs of connection portions will be described in greater detail below.

Figure 5:
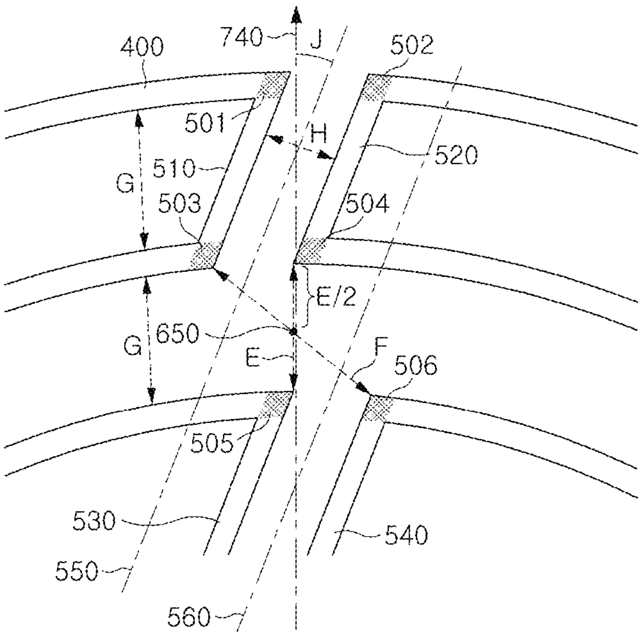
FIG. 5 more specifically illustrates a partial region 410 of the 1-zone heating element 400 included in the ceramic heater 100 according to an embodiment of the present disclosure.

FIG. 5 more specifically illustrates a partial region 410 of the 1-zone heating element 400 included in the ceramic heater 100 according to an embodiment of the present disclosure.

FIG. 5 illustrates the enlarged partial region 410 including pairs of connection portions of the 1-zone heating element 400 included in the ceramic heater 100 according to an embodiment of the present disclosure, disclosed in FIG. 4. When the structure of the pairs of connection portions is more specifically described with reference to FIG. 5, the illustrated 1-zone heating element 400 included in the ceramic heater 100 according to an embodiment of the present disclosure has multiple concentric circumferences, and may have a structure in which the concentric circumferences are connected to each other through connection portions 510, 520, 530, and 540 and in which the concentric circumferences are connected to the connection portions through bent portions 501, 502, 503, 504, 505, and 506.

A first connection portion 510, among a pair of connection portions 510 and 520 illustrated in FIG. 5, may be connected to two neighboring concentric circumferences through a first bent portion 501 and a third bent portion 503, and a second connection portion 520 may be connected to two neighboring concentric circumferences through a second bent portion 502 and a fourth bent portion 504. A straight extending line of the first connection portion 510 and a straight extending line of the second connection portion 520 may be line-symmetric with respect to a first connection portion pair symmetrical axis 550. In relation to another pair of connection portions 530 and 540 illustrated in FIG. 5, a straight extending line of a third connection portion 530 and a straight extending line of the fourth connection portion 540 may be line-symmetric with respect to a second connection portion pair symmetrical axis 560. As described above, each pair of connection portions included in the heating element 400 according to an embodiment of the present disclosure may have one connection portion pair symmetrical axis, which is an imaginary symmetrical line of straight extending lines of the connection portions.

Figure 6:
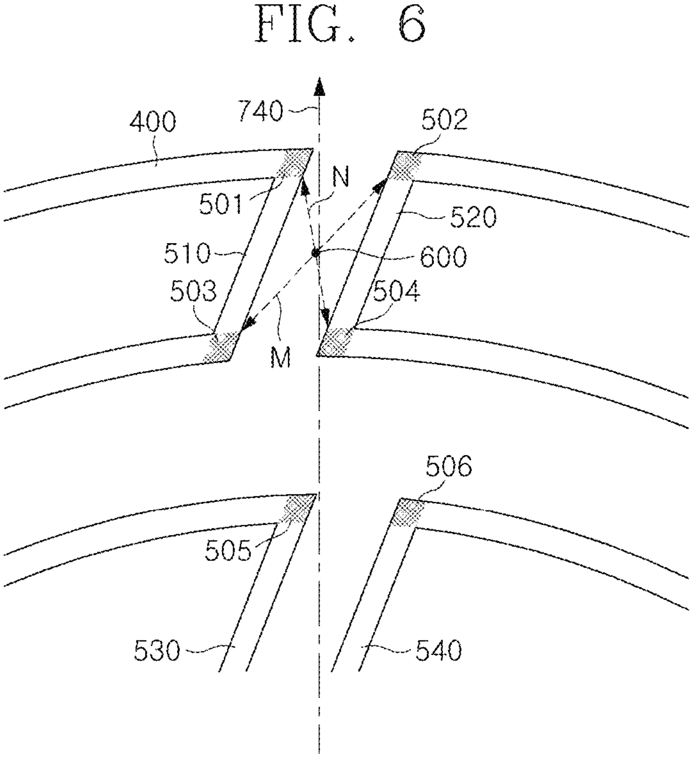
FIG. 6 illustrates an enlarged partial region of the heating element 400 included in the ceramic heater 100 according to an embodiment of the present disclosure in order to define the extension line of the heating element.

FIG. 6 illustrates the enlarged partial region 410 of the heating element 400 included in the ceramic heater 100 according to an embodiment of the present disclosure in order to define the extension line of the heating element 400.

When connection portions are formed obliquely in a design of the 1-zone heating element 400 included in the ceramic heater 100 according to an embodiment of the present disclosure, an imaginary line, which serves as a criterion to determine an angle at which the connection portions are formed. Hereinafter, the imaginary line will be called an extension line 740 or 750.

When the extension line is specifically defined with reference to FIG. 6, the extension line is a half line extending from the center 420 of the heating element, which is the center of concentric circumferences of the heating element included in the ceramic heater 100 according to an embodiment of the present disclosure, toward the center 600 of a pair of concentric circumferences connection portions. The center 600 of the pair of concentric circumference connection portions is an intersection point at which a line segment (N) formed by diagonally connecting the first bent portion 501 and the fourth bent portion 504, among four bent portions 501, 502, 503, and 504 connected to a pair of connection portions 510 and 520 of the heating element, meets a line segment (M) formed by diagonally connecting the second bent portion 502 and the third bent portion 503. In a design of a typical heating element, extension lines are commonly formed in two directions from the center of the heating element, but there may be a heating element in which extension lines are formed in three or more directions. In the structure of a heating element included in the ceramic heater 100 according to an embodiment of the present disclosure, it is assumed that two extension lines 740 and 750 are formed from the center 420 of the heating element, and that an angle formed by the two extension lines 740 and 750 is 180 degrees. However, this is only an example of the structure of a heating element included in a ceramic heater according to the present disclosure. In the structure of a heating element of a ceramic heater according to another embodiment of the present disclosure, the angle formed by two extension lines from the center of the heating element may be an angle that is different from 180 degrees.

Figure 1:
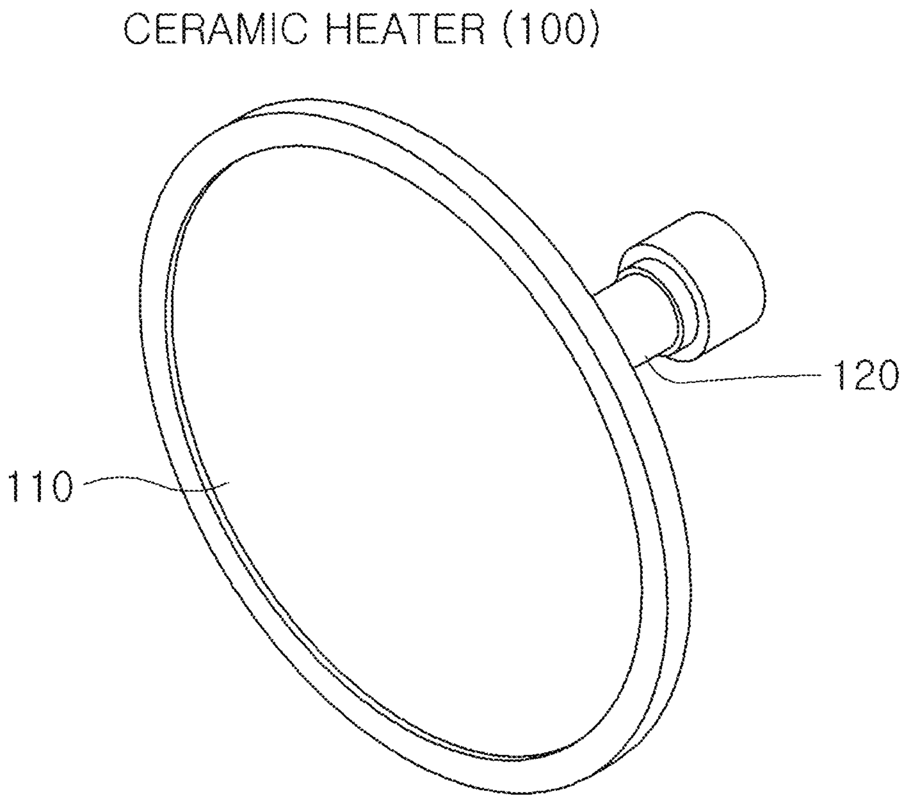
FIG. 1 illustrates an example of the structure of a ceramic heater 100.
Figure 2A:
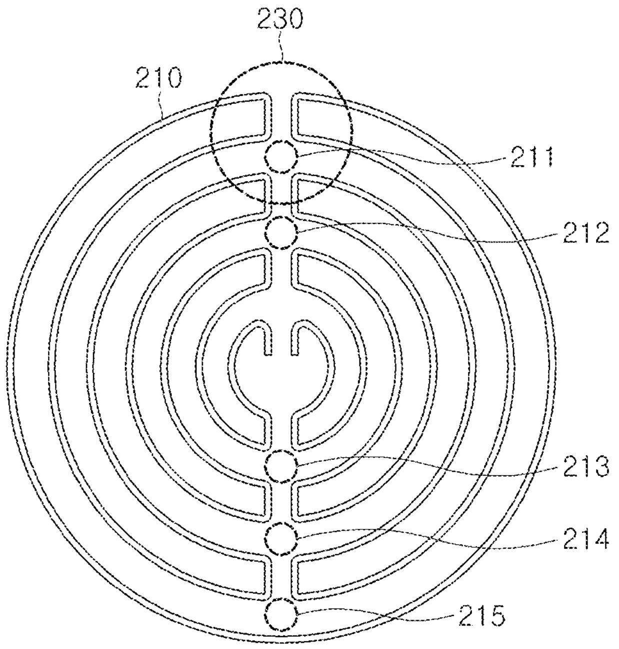
FIGS. 2A and 2B illustrate an example of the structure of a heating element included in a conventional ceramic heater.
Figure 2B:
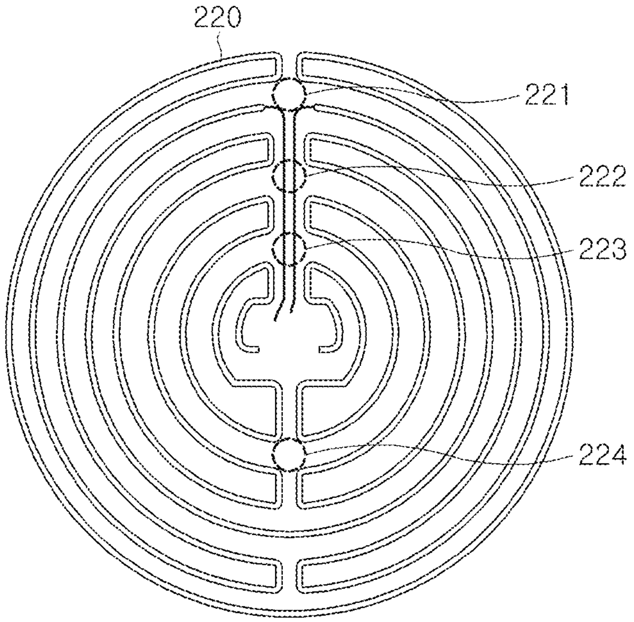
Figure 3:
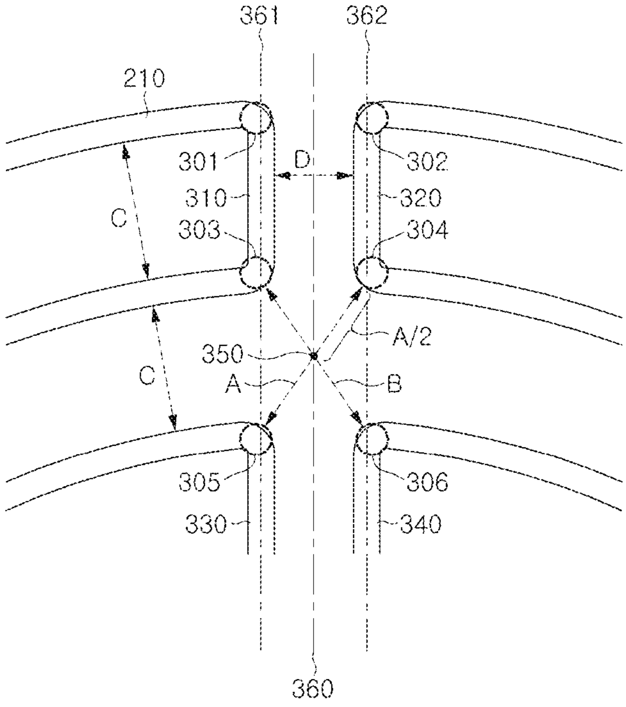
FIG. 3 illustrates an enlarged partial region 230, including a low-temperature region, of a conventional 1-zone heating element 210 illustrated in FIG. 2(A)

Now turning to FIG. 5, when the angle of a connection portion pair symmetrical axis is more specifically described, the connection portion pair symmetrical axis 550 may not be parallel to a first extension line 740. In other words, the connection portion pair symmetrical axis 360 of the heating element 210 included in the conventional ceramic heater illustrated in FIG. 3 may be parallel to the extension line or may be positioned on the same line together with the extension line. However, the connection portion pair symmetrical axis 550 of the heating element 400 included in the ceramic heater 100 according to the present disclosure, illustrated FIG. 5 may be formed while forming a predetermined angle with the first extension line 740. Therefore, the connection portions 510 and 520 of the heating element 400 included in the ceramic heater 100 according to the present disclosure may be designed and formed such that the connection portion pair symmetrical axis 550 does not extend through the center 420 of the heating element. An acute angle among angles formed by the connection portion pair symmetrical axis 550 and the first extension line 740 may be called a connection angle (J).

Thus, when the connection portion pair symmetrical axis 550 of the heating element 400 included in the ceramic heater 100 according to the present disclosure is formed while forming a predetermined angle with the first extension line 740, low-temperature regions may be expected to be removed from the space between four bent portions 503, 504, 505, and 506 of neighboring concentric circumferences which are not connected to each other through the connection portions 510, 520, 530, and 540. More specifically, when examining, in FIG. 5, the position 350 corresponding to a low-temperature region of the heating element 210 included in the conventional ceramic heater in FIG. 3, a low-temperature region may be formed at an intersection point 650 at which a diagonal line (F) formed by connecting the third bent portion 503 to the sixth bent portion 506 meets a diagonal line (E) formed by connecting the fourth bent portion 504 to a fifth bent portion 505. In the structure of the heating element included in the ceramic heater of the present disclosure, the diagonal line (E) formed by connecting the fourth bent portion 504 to a fifth bent portion 505 is shorter than the diagonal line (F) formed by connecting the third bent portion 503 to the sixth bent portion 506. Thus, the shortest distance between the intersection point 650 and the heating element is E/2, and may be considerably shorter than A/2 which corresponds to the distance between the position 350, corresponding to a low-temperature region of the heating element 210 included in the conventional ceramic heater illustrated in FIG. 3, and the heating element. Therefore, it is expected that a low-temperature can be reduced and removed at the intersection point 650.

When the connection portion pair symmetrical axis 550 of the heating element 400 included in the ceramic heater 100 according to the present disclosure is formed while forming a predetermined angle with the first extension line 740 and when the connection angle (J) is a specific angle, any one bent portion 501 or 504 may be positioned on the first extension line 740, and the specific connection angle (J) may be called a threshold angle. When the connection angle (J) is equal to or larger than the threshold angle, the shortest distance between the intersection point 650 of the diagonal lines (E) and (F) and the heating element is equal to G/2 which corresponds to half the distance between neighboring concentric circumferences of the heating element, and thus a low-temperature region can be reduced and removed at the intersection point 650 of the diagonal lines (E) and (F).

Mode for Carrying Out the Invention

Figure 7:
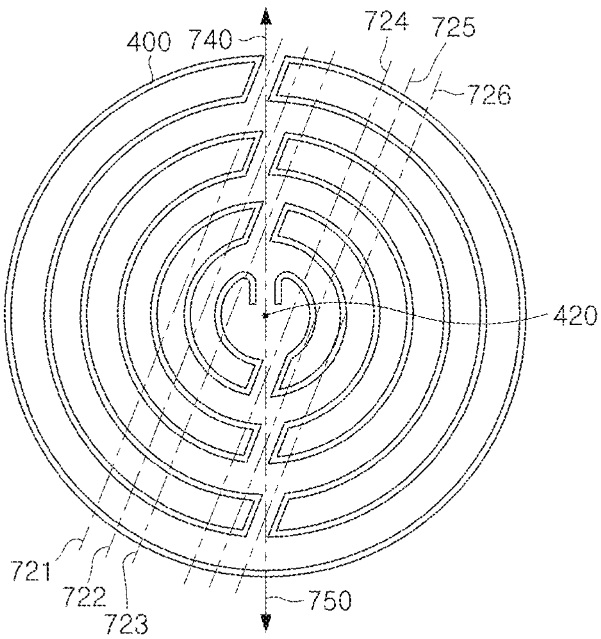
FIGS. 7 to 9 illustrate various structures of a 1-zone heating element included in the ceramic heater 100 according to an embodiment of the present disclosure.
Figure 8:
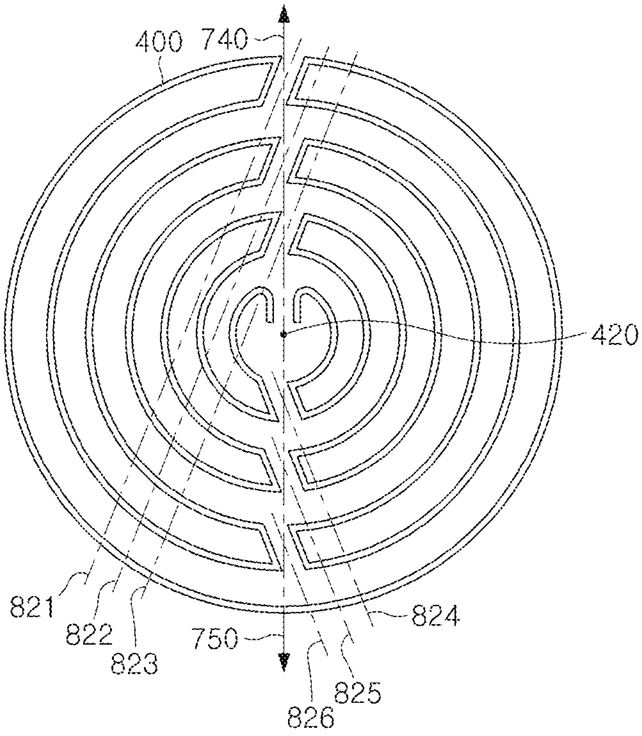
Figure 9:
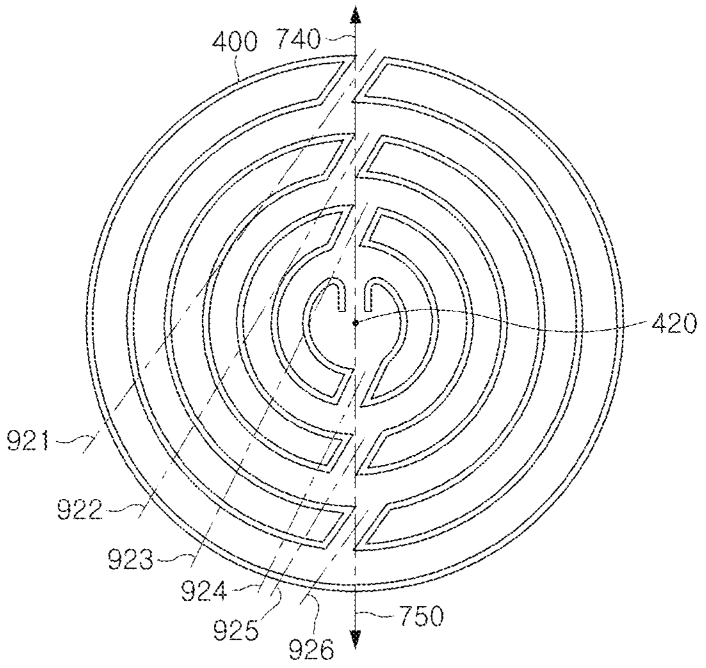

FIGS. 7 to 9 illustrate various structures of a 1-zone heating element included in the ceramic heater 100 according to an embodiment of the present disclosure.

Referring to FIG. 7, the 1-zone heating element included in the ceramic heater 100 according to an embodiment of the present disclosure may have six connection portion pair symmetrical axes 721, 722, 723, 724, 725, and 726 corresponding to six pairs of connection portions. Each pair of connection portions may be formed parallel to each other such that each connection portion pair symmetrical axis forms the same connection angle with the first extension line 740 or the second extension line 750, which extends from the center 420 of the heating element in two directions. In other words, the six pairs of connection portions included in the 1-zone heating element included in the ceramic heater 100 according to an embodiment of the present disclosure may be formed to be parallel to each other such that the six connection portion pair symmetrical axes 721, 722, 723, 724, 725, and 726 corresponding to six pairs of connection portions are parallel to each other.

Referring to FIG. 8, the 1-zone heating element included in the ceramic heater 100 according to an embodiment of the present disclosure may have six connection portion pair symmetrical axes 821, 822, 823, 824, 825, and 826 corresponding to six pairs of connection portions. Among the pairs of connection portions, pairs of connection portions of the heating element, disposed in a first direction from the center 420 of the heating element, may be formed such that three connection portion pair symmetrical axes 821, 822, and 823 intersecting with a first extension portion disposed in the first direction are parallel to each other. Among the pairs of connection portions, pairs of connection portions of the heating element, disposed in a second direction different from the first direction from the center 420 of the heating element, may be formed such that three connection portion pair symmetrical axes 824, 825, and 826 intersecting with a second extension portion disposed in the second direction are parallel to each other. A connection angle, which each of the three connection portion pair symmetrical axes 821, 822, and 823 intersecting with the first extension portion forms with the first extension portion, may be formed in the same size as but a different direction from a connection angle which each of the three connection portion pair symmetrical axes 824, 825, and 826 intersecting with the second extension portion forms with the second extension portion. More specifically, each of the connection portion pair symmetrical axes 821, 822, and 823 intersecting with the first extension portion may form an acute angle having a predetermined size in the clockwise direction at an intersection point at which the connection portion pair symmetrical axis intersects with the first extension portion, and each of the connection portion pair symmetrical axes 824, 825, and 826 intersecting with the second extension portion may form an acute angle having a predetermined size in the counterclockwise direction at an intersection point at which the connection portion pair symmetrical axis intersects with the second extension portion.

Referring to FIG. 9, the 1-zone heating element included in the ceramic heater 100 according to an embodiment of the present disclosure may have six connection portion pair symmetrical axes 921, 922, 923, 924, 925, and 926 corresponding to six pairs of connection portions, and each pair of connection portions, as necessary, may be formed such that each connection portion pair symmetrical axis forms a different connection angle with the first extension line 740 or the second extension line 750, which extends from the center 420 of the heating element in two directions. In other words, the six connection portion pair symmetrical axes 921, 922, 923, 924, 925, and 926 corresponding to the six pairs of connection portions of the heating element may form different connection angles in consideration of the temperature distribution on the heating surface of the ceramic plate, and thus the temperature distribution on the heating surface of the ceramic plate may be designed so as to meet the needs of a ceramic heater designer.

Figure 10:
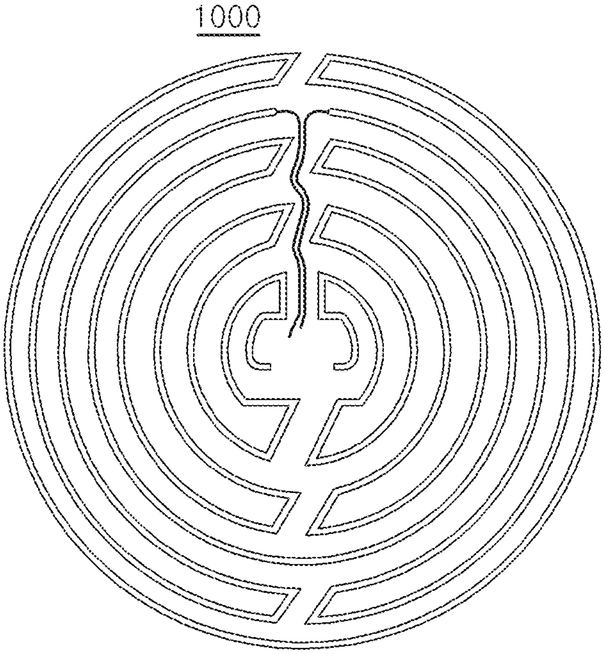
FIG. 10 illustrates the structure of a 2-zone heating element 1000 included in the ceramic heater 100 according to another embodiment of the present disclosure.

FIG. 10 illustrates the structure of a 2-zone heating element 1000 included in the ceramic heater 100 according to another embodiment of the present disclosure.

Referring to FIG. 10, pairs of concentric circumference connection portions of the 2-zone heating element 1000 included in the ceramic heater 100 according to another embodiment of the present disclosure may also be designed such that each connection portion pair symmetrical axis does not extend through the center of the heating element. Therefore, if the heating element connection portion structure according to the present disclosure is applied to the ceramic heater including the 2-zone heating element, a low-temperature region occurring by the heating element connection portion structure included in the conventional 2-zone ceramic heater can be removed.

The structures of the heating element included in the ceramic heater according to the present disclosure, illustrated in FIGS. 4 to 10, are provided only for illustrative purposes. The structure of the heating element included in the ceramic heater according to the present disclosure is not limited to a 1-zone or 2-zone structure, and may also be applied to a ceramic heater including a heating element having three or more zones of temperature regions.

FIGS. 11A to 11D illustrate temperature distribution on a heating surface of the ceramic heater 100 based on a connection angle (J) of the 1-zone heating element 400 included in the ceramic heater 100 according to an embodiment of the present disclosure.

Referring to FIGS. 11A to 11D, the shortest distance (G) between neighboring concentric circumferences of the heating element included in the ceramic heater is 1 mm, the distance (H) between a pair of concentric circumference connection portions is 0.5 mm, and the temperature of a heating surface of the ceramic heater is 500° C. Under the above conditions, measurement was taken of the temperature of the heating surface of the ceramic heater, corresponding to a low-temperature region formed in each of the cases in which an angle formed by a concentric circumference connection portion pair symmetrical axis and an extension line is (a) 30 degrees, (b) 45 degrees, and (c) 60 degrees. The measurement results were compared with the conventional ceramic heater, and then illustrated. As shown in FIG. 11D, the temperature of the heating surface of the ceramic heater, corresponding to a low-temperature region in Embodiment (a), is 493° C., the temperature of the heating surface of the ceramic heater, corresponding to a low-temperature region in Embodiment (b), is 498° C., and the temperature of the heating surface of the ceramic heater, corresponding to a low-temperature region in Embodiment (c), is 495° C. When the result is compared with 432° C. which is a temperature of a heating surface corresponding to a low-temperature region in the conventional ceramic heater, it may be determined that there is a considerable difference thererbetween. It may be determined that a low-temperature region is considerably reduced on the heating surface of the ceramic heater having the heating element structure according to an embodiment of the present disclosure, compared with a ceramic heater having a conventional heating element structure.

When an experiment was performed in the state in which the connection angle (J) of the heating element included the ceramic heater according to the present disclosure is designed to be equal to or smaller than 30 degrees, the reduction of the low-temperature regions was not remarkable. When an experiment was performed in the state in which the connection angle (J) of the heating element included the ceramic heater according to the present disclosure is designed to be equal to or larger than 60 degrees, in a heating element design, it was difficult to design a connection portion of a heating element close to the center of the heating element. Therefore, it may be most desirable that the connection angle (J) of the heating element included in the ceramic heater of the present disclosure is designed to be 30 to 60 degrees.

The material of a heating element included in a ceramic heater according to an embodiment of the present disclosure may include one among Mo2C, MoC, Mo3C2, and Mo. The material of the heating element may be designed so as to be mixed with one of Ti or C, or may be designed to be coated with one of Ti or C.

According to the ceramic heater 100 according to the present disclosure, it is possible to provide the ceramic heater wherein the temperature uniformity of a heating surface of a ceramic plate is improved by reducing a low-temperature region of a heating element included in the ceramic heater.

According to the ceramic heater 100 according to the present disclosure, it is possible to provide the ceramic heater 100 wherein the temperature uniformity of a heating surface of the ceramic heater is improved through only a design change to the structure of connection portions connecting concentric circumferences of a heating element included in the ceramic heater without adding any additional device.

Although the present disclosure has been described above on the basis of limitative embodiments and drawings and in conjunction with specific matters such as particular elements, these have been presented merely to help the comprehensive understanding of the present disclosure. The present disclosure is not limited by these embodiments, and those skilled in the art may make various modifications and changes thereto without departing from the essential features of the present disclosure. Therefore, the spirit of the present disclosure should not be defined only by the described embodiments (prior research, etc.), and the scope of the present disclosure should be construed to include all technical ideas defined by the appended claims and equivalents thereof.

INDUSTRIAL APPLICABILITY

The present disclosure can be applied to a ceramic heater.

The invention claimed is:

1. A ceramic heater comprising a heating element wherein connection portions of the heating element are formed such that connection portion pair symmetrical axes of pairs of the connection portions connecting concentric circumferences of the heating element do not extend through a center of the heating element, wherein each of the pairs of the connection portions are opposed and parallel to each other, each of the connection portion pair symmetrical axes intersects an extension line with a connection angle, and the extension line is a line extending from the center of the heating element to centers of the pairs of the connection portions.

2. The ceramic heater of claim 1, wherein the connection portion pair symmetrical axes include first connection portion pair symmetrical axes and second connection portion pair symmetrical axes, and wherein the first connection portion pair symmetrical axes, disposed in a first direction which is one direction from the center of the heating element, are parallel to each other, and the second connection portion pair symmetrical axes, disposed in a second direction which is another direction different from the first direction from the center of the heating element, are parallel to each other.

3. The ceramic heater of claim 2, wherein the first connection portion pair symmetrical axes are parallel to the second connection portion pair symmetrical axes, and wherein the first direction and the second direction are formed opposite to each other from the center of the heating element.

4. The ceramic heater of claim 1, wherein the connection angle of the heating element included in the ceramic heater is larger than a threshold angle and smaller than a right angle, wherein the connection angle is an acute angle formed by each of the connection portion pair symmetrical axes of the heating element and the extension line, and wherein the threshold angle is an acute angle formed by each of the connection portion pair symmetrical axes and the extension line when a bent portion connected to a corresponding one of the of connection portions of the heating element is positioned on the extension line.

5. The ceramic heater of claim 4, wherein the connection angle is 30 to 60 degrees.

6. The ceramic heater of claim 1, wherein a material of the heating element comprises one among Mo2C, MoC, Mo3C2, and Mo.

7. The ceramic heater of claim 6, wherein the material of the heating element is mixed or coated with one of Ti or C.

8. The ceramic heater of claim 1, wherein each of the pairs of the connection portions are symmetric with respect to a corresponding one of the connection portion pair symmetrical axes.

* * * * *